Sept. 28, 1965  J. I. FOURNIER  3,208,250
MECHANISM FOR STRAIGHTENING CYLINDRICAL BODIES BY AUTOMATION
Filed June 1, 1962  5 Sheets-Sheet 1

INVENTOR.
JOSEPH I. FOURNIER,
BY
McMorrow, Berman & Davidson
ATTORNEYS

Sept. 28, 1965  J. I. FOURNIER  3,208,250
MECHANISM FOR STRAIGHTENING CYLINDRICAL BODIES BY AUTOMATION
Filed June 1, 1962  5 Sheets-Sheet 3

INVENTOR.
JOSEPH I. FOURNIER,
BY
McMorrow, Berman & Davidson
ATTORNEYS.

Sept. 28, 1965  J. I. FOURNIER  3,208,250
MECHANISM FOR STRAIGHTENING CYLINDRICAL BODIES BY AUTOMATION
Filed June 1, 1962  5 Sheets-Sheet 4

INVENTOR.
JOSEPH I. FOURNIER,
BY
McMorrow, Berman & Davidson
ATTORNEYS.

Sept. 28, 1965 J. I. FOURNIER 3,208,250
MECHANISM FOR STRAIGHTENING CYLINDRICAL BODIES BY AUTOMATION
Filed June 1, 1962 5 Sheets-Sheet 5

INVENTOR.
JOSEPH I. FOURNIER,
BY
McMorrow, Berman & Davidson
ATTORNEYS.

United States Patent Office 3,208,250
Patented Sept. 28, 1965

3,208,250
MECHANISM FOR STRAIGHTENING CYLINDRICAL BODIES BY AUTOMATION
Joseph I. Fournier, 213 Irvington St., New Bedford, Mass.
Filed June 1, 1962, Ser. No. 199,474
12 Claims. (Cl. 72—10)

This invention relates to the general field of shaping methods or processes and machines especially designed for carrying out the same.

More specifically, the instant invention is directed to a method or process and a mechanism for bringing into true cylindrical configuration shafts, spindles, drill or tap blanks, arbors, reamers, tubular or tapered products, threaded stocks and other cylindrical bodies.

More especially, the instant invention is designed for straightening bar stock having a cylindrical transverse configuration, the stock being subsequently formed into a tool which is designed for rotation about its respective longitudinal axis.

Cylindrical bar stock, as is ordinarily furnished to the toolmaker, is seldom delivered in a form wherein the same is of uniform external diameter and wherein the longitudinal generatrix trace a true cylinder when the stock is rotated between opposed end center points. Unfortunately, such tool steel finds its way into the open market, and the use of the tool formed therefrom frequently does much irreparable damage where the working of the piece is to be held within relatively small tolerances.

Depending upon its composition, most tool steels are generally heated to approximately 2300° F., and then are quenched in oil to harden. Due to natural phenomena, the quenching causes distortion of the tool steel about its longitudinal axis which must be corrected before the tool steel can be utilized as a finished workpiece. Insofar as the prior art is concerned, it is known that the straightening of such tool steel is usually accomplished by manual operations. For example, on some occasions, the tool steel is supported by two substantially parallel bars and is heated by gas flames disposed therebeneath. The heat is generally applied uniformly to the central section of the bar stock and constitutes approximately 60% of its end-to-end length. The heat is supplied until the tool steel turns usually, cherry-red, and thereafter, the operator rotates the tool steel by tongs until one or more high or eccentric spots are rolled up. The operator then employs a manually-operable press to depress the one or more highs located longitudinally of the tool steel until he presumes, by eye, that the tool steel is straight.

Still another method is used in the industry to achieve tool steel within the desired tolerances. This process is expensive and requires the use of stock 15% to 20% larger than required in its finished size, and such stock is subjected to grinding to remove the high spots or distorted portions of the stock caused by hardening in order to give the stock or workpiece the desired size plus a true axis, and the removal of all outer scale while maintaining the desired working tolerance.

Hence, it is a primary object of this invention to provide a method or process, together with automatic power-operated mechanisms for use in the mass production of hard, but annealed cylindrical bodies which require uniformity in cylindrical configuration with close diametric tolerances over their entire longitudinal axes for effecting precision in manufacture capable of achieving exacting manufacturing standards.

Another object of this invention is to provide in apparatus of the type generally referred to supra, means for automatically supplying preheated cylindrical tool stock to a straightening machine.

A further object of this invention is to provide a novel means for feeding and loading tool steel stock to and between a pair of rotatable centering pins or chucks.

A still further object of this invention is to provide automatically-operable means for effecting axial movement of the aforesaid centering pins or chucks relative to each other to grasp and release the tool steel stock therebetween.

Still another object of this invention is to provide, in a device of the type generally referred to above, pins or chucks which automatically center the ends of the tool steel stock together with means to effect the quick removal and replacement of the pins or chucks in the event of damage thereto or in the due course of maintenance as a consequence of normal wear.

A still further object of this invention is to provide reciprocable means having a linear movement parallel to, but displaced laterally from the centerline between the two centering pins or chucks and including a work-engaging rotatable tool steel stock straightening element mounted on a shaft having its axis perpendicular to the aforesaid centerline, the shaft being rotatable or pivotal about its longitudinal axis.

This invention contemplates, as a still further object thereof, the provision of sensing means to determine if the work disposed between the pins or chucks is true within accepted tolerances.

This invention has as still another object, the provision of means cooperating with the aforementioned sensing means for separating workpieces having acceptable tolerances from those which are defective in this respect.

The invention has, as another object thereof, the provision of a device of the type described which is non-complex in construction and assembly, inexpensive to manufacture, and maintain, and which is durable in use, and a device which may be operated by relatively unskilled labor.

Other and further objects and advantages of the instant invention will become more evident from a consideration of the following specification when read in conjunction with the annexed drawings, in which:

FIGURE 6 is an enlarged, fragmentary, detail cross-sectional view taken substantially on the vertical plane of line 6—6 of FIGURE 3, looking in the direction of the arrows;

Figure 1:
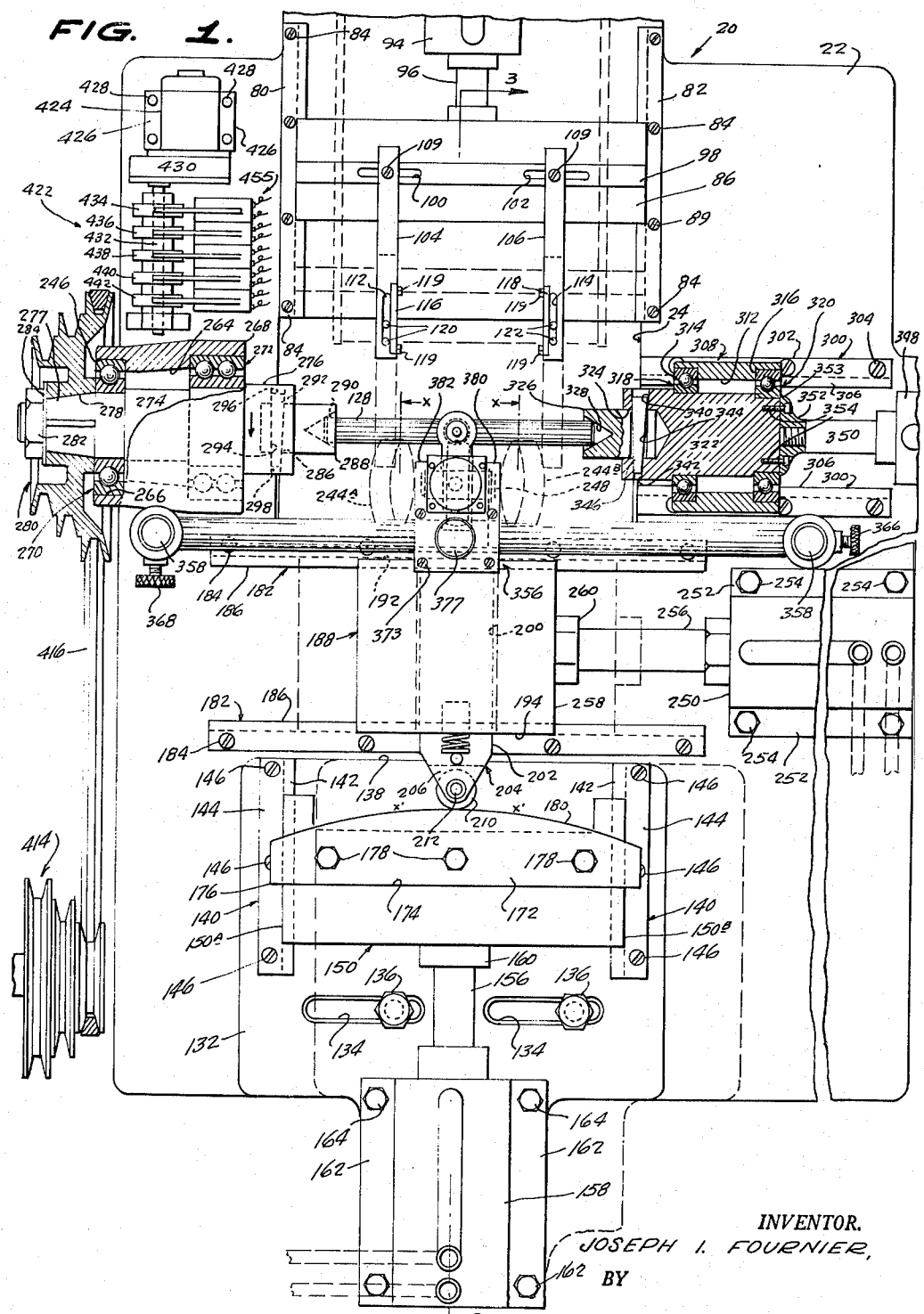
FIGURE 1 is a top plan view of a machine for straightening cylindrical bodies constructed in accordance with this invention.

Referring now more specifically to the drawings, reference numeral 20 designates, in general, an automatically-operable machine for straightening cylindrical bodies or shafts, the machine being constructed in accordance with the teachings of this invention. The machine 20 is seen to comprise an elongated, substantially rectangular bed or base plate 22 suitably supported in elevated horizontal position by any conventional means (not shown). Intermediate its opposed ends the bed or base plate 22 is formed with a transversely-extending substantially rectangular discharge opening 24 elongated in the direction perpendicular to the longitudinal axis of the bed 22. Depending from the bed 22 and fixedly secured thereto by conventional means are a pair of diverging chutes 26, 28 having a substantially rectangular transverse cross-sectional configuration of which the chute 26 includes a top wall 30 and a bottom wall 32. The chute 28 includes top and bottom walls 34 and 36, respectively.

The opposed sides of the chutes 26, 28 are closed by a pair of oppositely-disposed inverted, substantially V-shaped sidewalls 38, 40. The sidewall 38 includes the downwardly-diverging arms 42, 44 connected at the apex thereof by a bight portion 46, while the sidewall 40 includes the downwardly-diverging arms 47, 48 and a bight portion 50 at the point of junction or apex thereof.

As is seen in the drawings, the top walls 30, 34 and the bight portions 46, 50 are secured to the bed 22 in surrounding arrangement relative to the opening 24, and the bottom walls 32, 36 are joined at their respective ends on a line of juncture spaced below the opening 24 and extending transversely and medially thereof.

Reference numeral 52 denotes an elongated, substantially rectangular separator plate which extends transversely between the bight portions 46, 50 and has integrally formed therewith, at one longitudinally-extending edge, a pair of stub shafts 53, 54 that are journaled in bosses 56, 58 (see FIGURE 4), respectively, the bosses 56, 58 being integral with the bights 46, 50 and projecting laterally and outwardly therefrom. As is seen in FIGURES 2 and 6, the lower longitudinal-extending edge of the separator plate 52 is rounded, as at 60, in order to pivot on the upper ends of the bottom walls 32, 36 along the line of juncture thereof, and the upper edge 61 of the plate 52 normally abuts against the side 24' of the opening 24. In this position, as shown in full lines in FIGURES 1, 2 and 4, the upper end of the chute 28 is closed, and the upper end of the chute 26 is open. Under certain conditions to be described, infra, the plate 52 is moved to its dotted-line position in which case the opening to the chute 26 is closed, and that of 28 is opened. When the plate 52 is moved to its dotted-line position, the upper edge thereof engages against the side 24" of the opening 24, the side 24" being oppositely-disposed with respect to the side 24'. Thus, depending upon the position of the plate 52, the same may be considered as an extension of either the bottom wall 32 or of the bottom wall 36.

Figure 2:
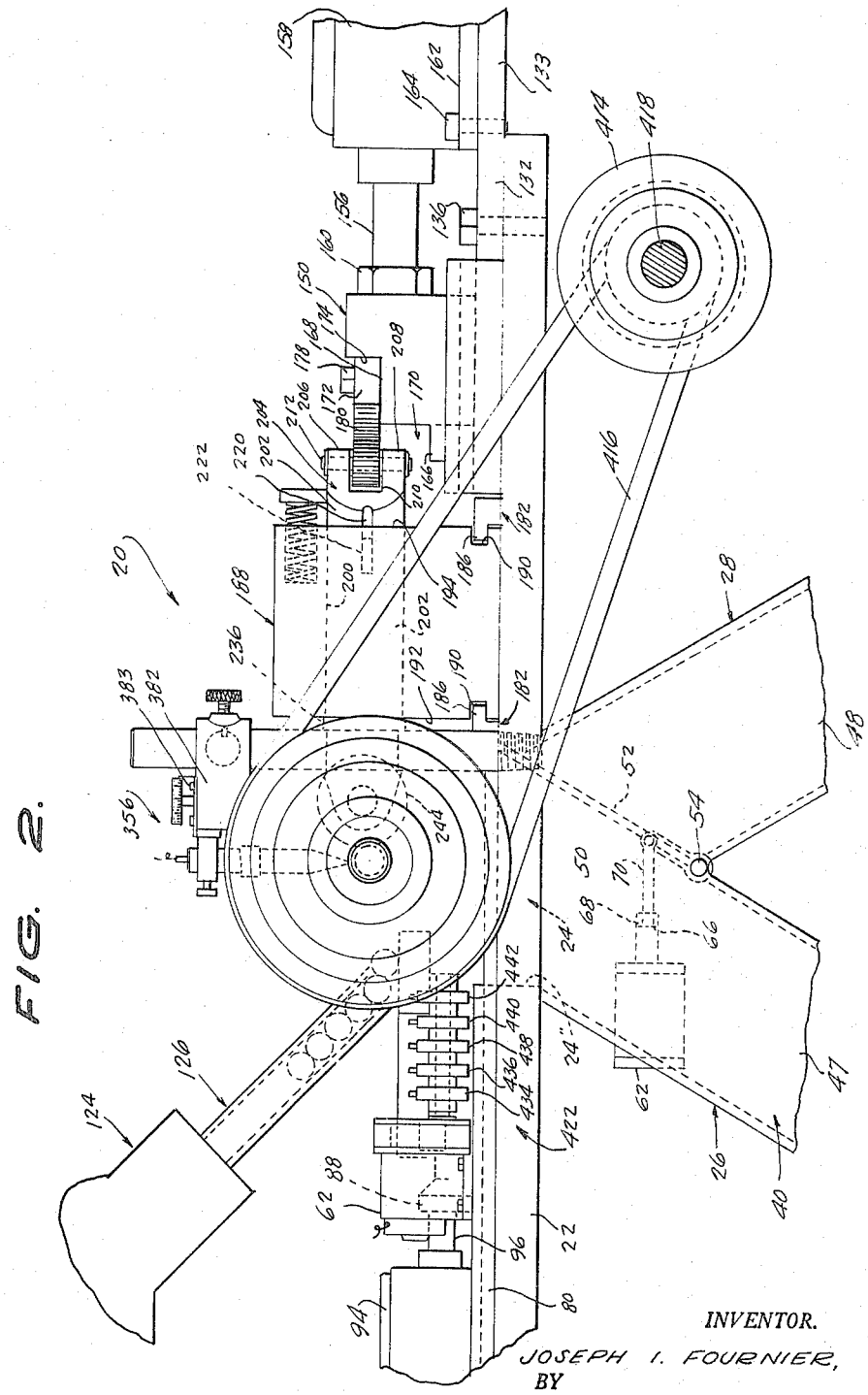
FIGURE 2 is one side elevational view of the machine shown in FIGURE 1.
Figure 3:
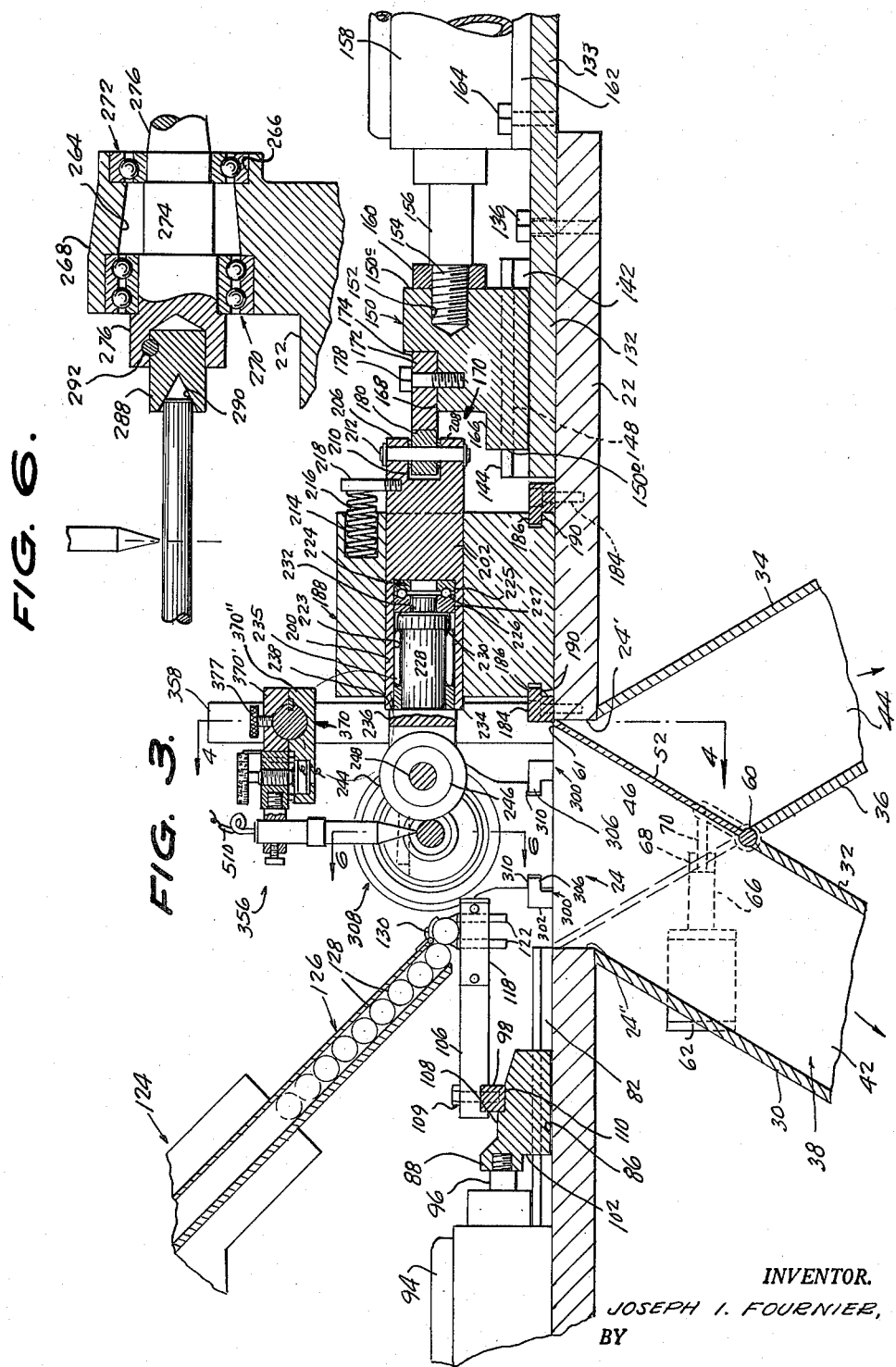
FIGURE 3 is a medial longitudinal cross-sectional view of the machine, FIGURE 3 being taken substantially on the vertical plane of line 3—3 of FIGURE 1, looking in the direction of the arrows.
Figure 4:
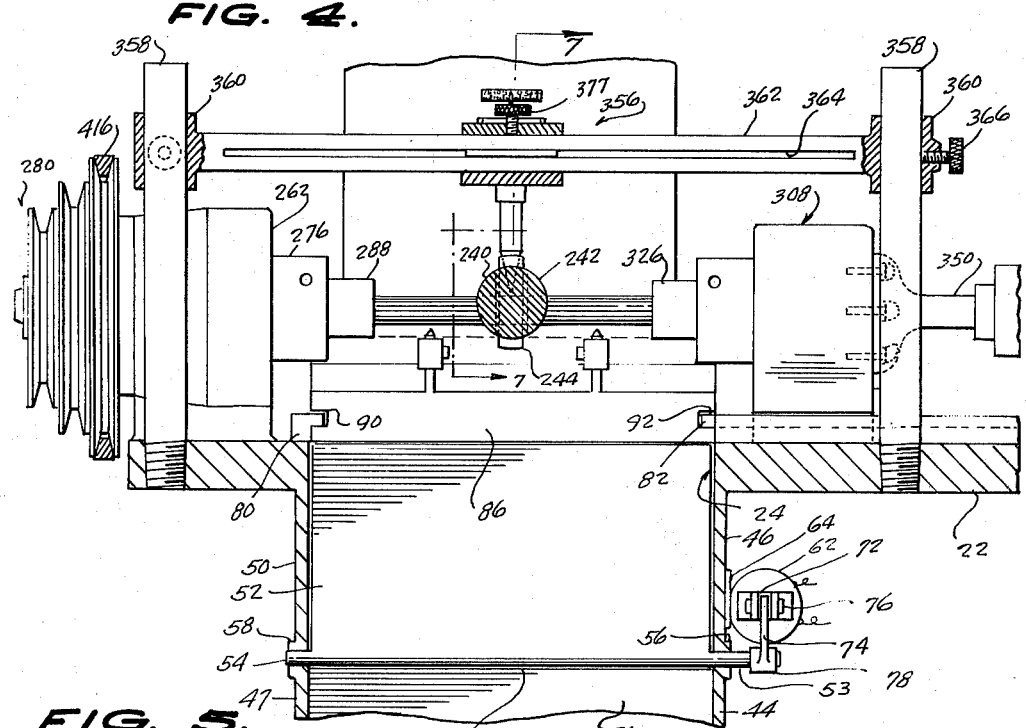
FIGURE 4 is a fragmentary, enlarged, transverse cross-sectional view, FIGURE 4 being taken substantially on the vertical plane of line 4—4 of FIGURE 3, looking in the direction of the arrows.

As is seen in FIGURES 2, 3, 4 and 5, an electrically-operated solenoid 62 is bracket-mounted at 64 to the outer side of the bight portion 46, the solenoid 62 having an armature 66 spring-biased to its extended position, the armature 66 being provided with a bifurcated outer end 68 (see FIGURES 2, 3 and 4). One end of an elongated link 70 is pivotally connected to the bifurcated end 68 of the armature 66, and the other end of the link 70 is also provided with a bifurcated end 72 (see FIGURE 4) to receive therein one end of a crank arm 74, the pivotal connection being made by means of pivot pin 76. The crank arm 74 projects radially from a hub 78 with which the other end of the crank arm 74 is integrally connected. The hub 78 is, in turn, rigidly connected on an exteriorly-projecting portion of the stub shaft 53.

It is now obvious that with the energization of the solenoid 62, the armature 66 will retract, causing the plate 52 to pivot in a counterclockwise direction, reference being made to FIGURE 3, thereby moving from its full-line position to its dotted-line position. De-energization of the solenoid 62 will permit the armature 66 to move in the opposite direction under the influence of its bias and thereby return the plate 52 from its dotted-line position to its original full-line position, reference being again made to FIGURE 3.

Referring specifically to FIGURES 1, 2, 3 and 4, it is seen that a pair of inverted, laterally-spaced and confronting L-shaped rails 80, 82 project upwardly from the bed 22, the rails being spaced inwardly from the longitudinally-extending edges of the bed. As is seen in FIGURE 1, the rails are secured to the bed 22 by means of bolts 84. Mounted for reciprocation between the rails 80, 82 is a transversely-extending, substantially rectangular feeder block 86 having a centrally-positioned, laterally-offset internally-threaded boss 88 facing away from the opening 24. The rails 80, 82 are slidably received within grooves 90, 92 (see FIGURE 4) formed in the opposed ends of the block 86. Mounted on the bed 22 is a hydraulic cylinder 94 having a reciprocable piston rod 96. The outer end of the piston rod 96 is threadably received within the boss 88 whereby reciprocation of the rod 96 effects a similar movement of the block 86 as the same tracks the rails 80, 82, toward and away from the opening 24.

Fixedly secured to the block 86 and projecting thereabove, is a bar 98 having its longitudinal axis parallel to the longitudinal axis of the block 86. The bar 98 is formed with a pair of longitudinally-spaced, inverted, substantially V-shaped slots 100, 102 depending transversely therethrough, the slots 100, 102 opening upwardly through the crosshead portion thereof from the lower side of the bar 98 (see FIGURES 1 and 3).

Reference numerals 104, 106 denote a pair of elongated stock-feeder arms substantially in rectangular transverse configuration, the outer ends of the feeder arms 104, 106 being notched-out as at 108 (see FIGURE 3) to receive therein the upper end of the bar 98 and to fit snugly thereon. The feeder arms are adjustably connected to the bar 98 for axial movement thereon by means of screws 109 which extend through the feeder arms 104, 106 and through the slots 100, 102 for threaded engagement with nuts 110 disposed therein. The notching of the feeder arms 104, 106 prevents the same from pivoting about their respective screws 109 as an axis. The arms 104, 106, adjacent their respective inner ends, are recessed at 112, 114 (see FIGURE 1), the recesses extending vertically and transversely therethrough and being disposed in confronting relationship relative to one another. Each of the recesses 112, 114 is closed by a clamping plate 116, 118, respectively, releasably secured thereto by screws 119. Disposed within the recesses 112, 114 are pairs of stock-receiving pins 120, 122, respectively, which are adapted to be clamped between the arms 104, 106 and the plates 116, 118 in longitudinally-adjusted position to accommodate stock of varying diameters therebetween.

Disposed over the bed 22 and supported in any desirable manner above the block 86 and hydraulic cylinder 94 is a metal stock hopper 124 and a stock-discharge chute 126. The cylindrical tool steel or workpieces 128 contemplated to be handled by this machine may range between $\frac{1}{16}$-inch in diameter and 2-inches in axial length through stock 1-inch in diameter with an axial length of 12-inches. The workpieces 128 may require straightening because they may not conform or true-up to give factory specifications, the distortion taking place along the longitudinal axis of each workpiece. The distortion is generally the result of the tool steel hardening process, and, therefore, the workpieces 128, when working with hardened metals, must be heated to their annealing temperature before straightening. The annealing temperature will, necessarily vary from one composition of tool steel to another, depending upon the composition thereof, and the annealing temperatures are well-known to metallurgists. In view of the fact that annealing temperatures are old and well-known for conventional steels and alloys, and of other metals, it is not deemed essential for the purpose of disclosing this invention that the same be set forth herein.

The stock hopper 124 is conventional in construction and the interior thereof is heated to such a temperature as to raise the stock 128 to its annealing temperature. This may be accomplished by induction heat, or other suitable electric types of heat. Preferably, the stock 128 is heated slightly above its normal annealing temperature in order that certain operations may be carried out thereon, these operations being set forth in detail below.

The chute 126 is also of conventional construction and is downwardly-inclined toward the pins 120, 122 whereby, under certain conditions, stock from the chute 126 may be deposited between each adjacent pair of pins 120, 122 for movement with the arms 104, 106. It has been found desirable to hingedly connect a closure plate 130 to the chute 126 for extension across the lower end of the chute when the pins 120, 122 are not in position to receive one of the workpieces 128.

On that end of the bed 22 remote from the cylinder 94 is superimposed a substantially rectangular adjustable plate 132 which is slidable thereon in a direction normal to the longitudinal axis of the bed. The adjustable plate 132 is integral with an elongated, substantially rectangular extension 133 that projects beyond the adjacent end of the bed 22. The adjustable plate 132 is formed with a pair of laterally-spaced, elongated, substantially rectangular transversely-extending slots 134 having aligned longitudinal axes disposed at right angles with respect to the longitudinal axis of the bed 22. Each slot 134 receives transversely therethrough a headed bolt 136 which is threaded into the bed 22 to hold the adjustable plate 132 in fixed position relative to the bed 22.

Extending inwardly from the inner end 138 of the adjustable plate 132 are a pair of identical, elongated, laterally-spaced and substantially parallel L-shaped tracks 140 disposed in confronting relation. Each track 140 is formed with a foot portion 142 and a leg portion 144, and through the latter extend screws 146 which are threaded into the adjustable plate 132 to hold the foot portions 142 firmly thereagainst in surface-to-surface engagement. The foot portions 142 project toward one another and are adapted to be received within grooves 148 that extend upwardly from the underside of an elongated, substantially rectangular traveling block 150 (see FIGURES 1, 2 and 3). The grooves 148 extend transversely of the traveling block 150 at the opposed ends 150A, 150B thereof. The ends 150A, 150B of the block 150 slidably engage the leg portions 144 of the rails 140 as the traveling block 150 reciprocates therebetween. The block 150, at that side 150C thereof facing the plate extension 134, is provided with an internally-threaded socket 152 in which is received the threaded end 154 of the piston rod 156 of a conventional hydraulic cylinder 158. Lock nut 160 fixedly secures the threaded end 154 within the socket 152. The hydraulic cylinder 158 is integral with longitudinally-extending, laterally-projecting mounting flanges 162 which, by means of screws 164, secure the cylinder 158 to the plate extension 134.

The opposite longitudinally-extending side 150D of the traveling block 150 is rabbeted to form a pair of vertically-spaced, longitudinally-extending, parallel shoulders 166, 168. The rabbeting resulting in the shoulder 166 provides a working space 170 for machine operations to be described, and the rabbeting giving rise to the shoulder 168 serves as a seat for an elongated cam 172. The shoulder 168 has a vertically-extending planar abutment surface 174 projecting thereabove against which is engaged the planar longitudinally-extending side 176 of the cam 172 (see FIGURE 1). The cam 172 is fixedly held in its seat by means of screws 178. The opposite side of the cam 172 is provided with an arcuately-shaped cam surface 180 which is tracked by means to be described.

Referring now more particularly to FIGURES 1, 2 and 3, it is seen that a pair of inverted L-shaped rails 182 are fixedly secured to the bed 22 by screws 184 with the foot portions 186 thereof disposed in confronting relation. The rails 182 are laterally-spaced from one another and are perpendicular to the rails 140, the rails 182 being disposed intermediate the opening 24 and the inner ends of the rails 140.

An elongated, substantially rectangular carriage 188 is provided with a pair of longitudinally-extending grooves 190 formed in the opposed sides 192, 194 of the carriage 188, the grooves being located adjacent the underside of the carriage 188 and receive the rails 182 therein to mount the carriage 188 for reciprocation thereon with the underside of the carriage 188 in sliding engagement with the bed 22.

Extending transversely through the carriage 188, centrally between the opposed sides 192, 194 thereof, is a smooth bore 200 in which a plunger rod 202 is secured for reciprocation.

The plunger rod 202 is of such axial length so as to extend beyond the sides 192, 194 of the carriage 188. That end of the rod 202 facing the traveling block 150 is tapered as at 204 and is horizontally bifurcated to form the arms 206, 208. A cam follower roller 210 is disposed between the arms 206, 208, the roller 210 being supported for rotation therebetween on a roller pin 212 carried thereby. The roller 210 is adapted to track the cam surface 180 as the carriage 188 reciprocates on the rails 182.

The carriage 188 is formed with a cylindrical socket 214 which extends inwardly from the side 194, the socket 214 being vertically-spaced above the bore 200 and having its longitudinal axis parallel to the longitudinal axis thereof. Seated within the socket 214 is one end of a helicoidal spring 216, the other end of the spring 216 extending beyond the side 194 for engagement with one end of a vertically-extending pin 218, the other end of the pin 218 being threaded into the plunger rod 202 adjacent its tapered end 204. It is thus seen that the plunger rod 202 is constantly biased for movement in a direction to maintain the roller 210 in engagement with the cam surface 180.

The plunger rod 202 is prevented from rotating about its longitudinal axis by an axially-extending, outwardly-projecting rib 220 which is engageable within a slot 222 extending inwardly from the side 194 of the carriage 188.

The plunger 202 has a cylindrical bore 223 extending inwardly from the other end thereof, and the inner closed end of the bore 223 has seated thereagainst a bearing 224 comprising inner and outer bearing races 225, 226, respectively, between which are interposed a plurality of ball bearings 227.

Disposed within the bore 223 and coaxial therewith is an elongated barrel 228, see FIGURE 3, having an enlarged circumferential, outwardly-extending flange 230 adjacent the inner end thereof. The inner end of the barrel 228 is necked-down to form a hub 232 which is supported in the outer bearing race 224 with the flange 230 bearing thereagainst. The bearing 224 is, in fact, a thrust bearing.

The outer end of the barrel 228 extends through an annular bushing 234 positioned at the outer end of the bore 223 and fixedly secured therein. Interposed between the bushing 234 and the flange 230 are a plurality of elongated roller bearings 235. The barrel 228 at its outer end is enlarged at 236 to a diameter slightly greater than the diameter of the bore 223 to provide a circular shoulder 238 adapted to engage against the barrel 228 at the outer end of the bore 223. The outer end of the barrel 228 is vertically bifurcated and carried between the arms 240, 242 thereof (see FIGURES 2, 4 and 7) is a bar stock straightening roller 244. The roller 244 is mounted on a conventional bearing 246 which is, in turn, supported on an axle 248, the opposed ends of the latter being adapted to be supported on the arms 240, 242. Under operation of the device 20 to be described below, the roller 244 tilts to one of the two dotted-line positions 244A, 244B shown in FIGURE 1, depending upon the direction of travel of the carriage 188. The tilting movement is made, of course, about the longitudinal axis of the barrel 228.

Means are provided for effecting reciprocation of the carriage 188, the means comprising a conventional hydraulic cylinder 250 having oppositely-disposed, longitudinally-extending mounting flanges 252 through which extend screws 254 that thread into the bed 22 to fixedly secure the hydraulic cylinder 250 thereto. The hydraulic cylinder 250 is positioned proximate a pair of adjacent ends of the rails 182, and the piston rod 256 thereof is reciprocable substantially centrally between the rails 182 in the direction of their respective longitudinal axes. As in the case of the piston rod 156, the piston rod 256 is threaded into the end 258 of the carriage 188 and is held against displacement by the lock nut 260. Thus, as the piston rod 256 is reciprocated, the carriage 188 will move in the same direction.

Reference numeral 262 denotes a bearing block mounted on or formed integrally with the bed 22 adjacent one end of the opening 24. The block 262 has a horizontal cylindrical opening 264 formed therethrough with the longitudinal axis of the opening 264 falling substantially on or being substantially parallel to the longitudinal axis of the opening 24 in vertically-spaced relation relative thereto. The bearing block 262, at each end of the opening 264, is counterbored as at 266, 268, respectively, and receive therein the annular ball bearings 270, 272. Journaled in the bearings 270, 272 is a shaft 274. One end of the shaft 274 is enlarged at 276 and bears against the bearing 272; the other end of the shaft 274 is reduced to bear against the inner side of the bearing 270, and this end of the shaft is tapered at 277 to receive a complementary tapered hub 278 of a multiple pulley 280. Lock nut and washer 282, 284, respectively, retain the pulley 280 on the tapered shaft end 276 with the inner end of the hub 278 engaging the outer side of the bearing 270. The bearings 270, 272 are thus locked against axial displacement.

The enlarged end 276 of the shaft 274 is formed with an integrally-extending coaxial bore 286 in which is inserted one end of a work-holding chuck 288. The exposed end of the chuck 288 is provided with a coaxial inwardly-extending conical opening 290 with the degree of taper being substantially 60°. The chuck 228 is releasably secured in the enlarged shaft end 276 by means of a tapered keeper pin 292 which extends diametrically across the opening 290 through a diametrically-extending tapered bore 294 formed in the chuck 288, the opposed ends of the pin 292 being received within diametrically-opposed openings 296, 298 formed in the chuck 288 adjacent its outer end.

Reference numeral 300 designates a pair of laterally-spaced inverted, substantially L-shaped rails having leg portions 302 secured to the bed by means of screws 304 (see FIGURE 1). The leg portions 302 terminate in laterally-extending off-set foot portions 306 disposed within confronting relation relative to one another. The rails 300 extend parallel to one another and the centerline therebetween falls on substantially the longitudinal axis of the slot 24 and is coincident with or parallel to the longitudinal axis of the shaft 274.

A second bearing block 308 is provided, the block 308 slidably engaging the bed 22 and, adjacent the lower end thereof, the block 308 is provided with a pair of grooves 310 that are adapted to receive the foot portions 306 of the rails 300.

The block 308 has a substantially horizontal bore 312 extending therethrough with the axis thereof disposed coaxially with respect to the axis of the base 264. The opposed ends of the block 308 are countersunk as at 314, 316 to provide seats for the annular ball bearings 318, 320 respectively. Disposed on and journaled in the bearings 318, 320 is a shaft 322 having a bore 324 extending inwardly from that end thereof adjacent to or facing the block 262 (see FIGURE 1), and the axis of the bore 324 is coaxial with the axis of the bore 264. Disposed within the bore 324 is one end of a second elongated, substantially conical work-holding chuck 326 having an inwardly-extending conical opening 328 coaxial therewith and with the conical opening 290. As is seen in FIGURE 1, the bases of the two conical openings 290, 328 are disposed in confronting relation relative to each other and are coaxial. The opening 328 is cut on a taper of 60° to match the angle of taper of the conical opening 290.

The shaft 322 is formed with two diametrically-opposed openings 340, 342 with which is aligned a bore 344 extending diametrically through the inner end of the chuck 326, the openings 340, 342 and the bore 344 receiving therein a removable locking pin 346.

The block 308 is reciprocated on the rails 300 by means of a hydraulic cylinder 348 fixedly secured to the bed 22 by conventional means (not shown), and the outer end of the piston rod 350 thereof is threaded into the hub 352 of a cap 353 secured to the adjacent end of the shaft 322 by screws 354. The longitudinal axis of the piston rod 350 is substantially parallel to the centerline between the pair of rails 300.

The sensing means for determining if a given workpiece 128 is true within given tolerances is indicated, generally, by reference numeral 356. The sensing means comprises a pair of vertically-extending upright standards 358, the lower ends of which are threaded into the bed 22 (see FIGURE 4), each standard being positioned, respectively, adjacent the opposed ends of the opening 24 and adjacent the side 24′ thereof. Slidably mounted on each of the standards 356 for adjustment axially thereof, is a collar 360 which is integrally connected with a horizontal cylindrical bar 362 that extends therebetween. The bar 362 is formed with an axially-extending external keyway 364. The collars 360 are held in adjusted positions by means of set screws 366, 368, the set screws 366 being substantially coaxial with the longitudinal axis of the bar 362, while the set screw 368 has its centerline at substantially right angles thereto in order to clear the pulley 280 (see FIGURES 1 and 4).

Reference numeral 370 denotes a substantially rectangular mounting block (see FIGURES 3 and 7), the mounting block 370 being comprised of upper and lower superimposed block sections 370′, 370″ each having confronting semi-circular recesses 371, 372, respectively, formed therein and forming a substantially cylindrical passage 373 extending transversely therethrough, the passage 373 receiving the bar 362 therethrough to permit reciprocation of the block 370 thereon thereof. The block 370 has a longitudinally-extending keyway 374 formed therein through confronting grooves 374′, 374″ cut in the block sections 370′, 370″, the keyway 374 opening into the passage 372 and being aligned with the keyway 364. The two keyways 364 and 374 receive a key 376 therein to lock the block 370 against rotary movement about and around the longitudinal axis of the bar 362 (see FIGURE 7). The block 370 is fixed in adjusted poistion on the bar 362 by means of the set screw 377.

Figure 7:
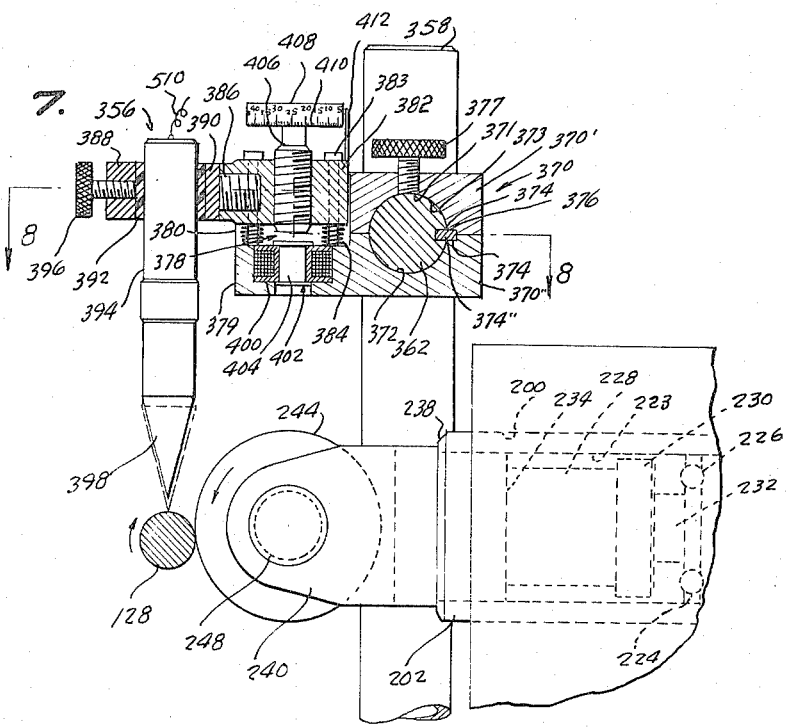
FIGURE 7 is an enlarged, fragmentary, detail cross-sectional view, FIGURE 7 being taken substantially on the line 7—7 of FIGURE 4, looking in the direction of the arrows.
Figure 8:
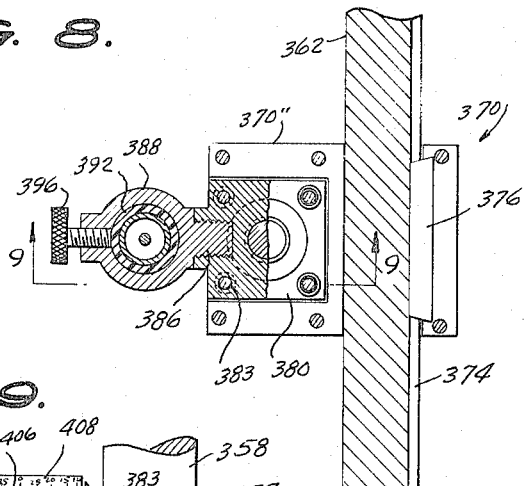
FIGURE 8 is an enlarged detail cross-sectional view, FIGURE 8 being taken substantially on the line 8—8 of FIGURE 7, looking in the direction of the arrows.
Figure 9:
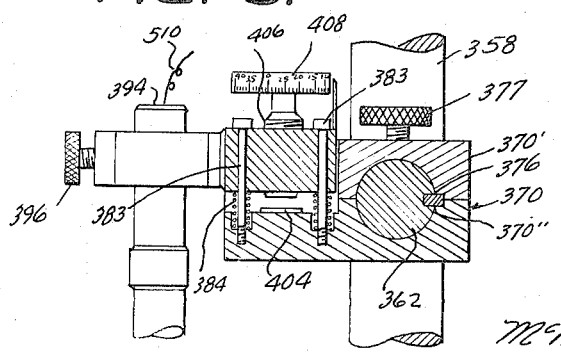
FIGURE 9 is an enlarged, detail, fragmentary cross-sectional view, FIGURE 9 being taken substantially on the horizontal plane of line 9—9 of FIGURE 8, looking on the direction of the arrows.

The other end of the block 370 is formed with an inwardly-extending substantially rectangular recess 378 to provide a horizontal platform 379 having laterally-spaced upright sidewalls 380, 381 (see FIGURES 2 and 7).

Disposed within the recess 378 and superimposed over the platform 379 is a substantially rectangular carrier block 382 formed of magnetizable material and suitably bored adjacent each corner thereof to receive bolts 383, the lower ends of the latter being threaded for engagement into the platform 379. The connection is such that the carrier block 382 may smoothly reciprocate in a vertical direction on the bolts 383 toward and away from the platform 379. Surrounding each of the bolts 383 and interposed between the lower end of the carrier block 382 and the platform 379 is a helicoidal spring 384 (see FIGURE 7). The helicoidal springs 384 constantly tend to bias the carrier block 382 for movement away from the platform 379.

Threaded into the block 382 is one end 386 of an elongated cylindrical element 388 (see FIGURE 7) having a vertical bore 390 adjacent its other end. Disposed within the bore 390 is a cylindrical collar 392 formed of any desirable electrical insulating material. Positioned within the collar 392 for axial adjustment relative thereto is one end of an elongated cylindrical sensing element 394 formed of a metallic electric conducting material. The sensing element is held in adjusted relation relative to the bore 390 by means of a set screw 396, and the lower end of the sensing element is tapered as at 398.

The platform 379 is countersunk at 400 to provide a seat for an electromagnet 402 having an armature 404. Threaded transversely through the carrier block 380 is a micrometer screw 406, the lower end of the latter being disposed in confronting relation relative to the armature 404 and extending below the underside of the carrier block 382. The lower end of the micrometer screw 406 serves as a stop, in cooperation with the armature 404, to limit the downward movement of the block 382 on the bolts 383 when the armature 404 is energized. The micrometer screw 406 carries an elongated head 408 having scaler indicia 410 inscribed on the circumferential side thereof. Reference numeral 412 denotes a scale indicator fixed on the carrier block 382 and extending in spaced relationship transversely across the circumferential side of the head 408.

From the foregoing description it is obvious that when the magnet 402 is energized, the carrier block 382 moves downwardly toward the same, and in so moving, carries the cylindrical element 394 therewith. De-energization of the magnet 402 permits the block 382 to move away from the magnet 402 under the influence of the springs 384.

The tapered end 398 overlies the centerline extending between the work-holding chuck 288, 326 and is adjustable longitudinally thereof.

Reference numeral 414 denotes a second variable pulley aligned with the pulley 280 and placed in driving relation therewith by means of the endless V-pulley belt 416. The pulley 414 is fixedly secured on the drive shaft 418 of an electric motor (not shown).

The machine 20 operates cyclicly through control means designated, in general, by reference numeral 422, which includes a variable-speed electric motor 424 laterally spaced from the hydraulic cylinder 94 and which is provided with mounting flanges 426 secured to the bed 22 by bolts 428. The motor 424 drives a gear reduction system 430 having a drive shaft 432 on which are mounted a bank of axially-spaced cams 434, 436, 438, 440, and 442. These cams are adapted to engage and operate the switch arms 444, 446, 448, 450 and 452 (see FIGURES 1 and 5) of a bank of micro-switches 455, the bank 455 being fixedly secured to the bed 22 by conventional means, not shown.

The hydraulic cylinders 94, 158, 250 and 348 are operable through solenoid control valves 456, 457, 458 and 460, which are energized and de-energized by the closing and opening of the switches 444, 446, 448 and 450, in a manner to be described, and the energization and de-energization of the electromagnet 402 of the sensing mechanism is controlled by the closing and opening of the switch 452.

The leads 462, 464 are connected to a conventional source of E.M.F., and a wire 466 connects with the lead 462 and the switch arms 444, 446, 448, 450 and 452; the lead 464 connects through wire 468 and wires 470, 472, 474 and 476 with one side of the solenoid windings of the solenoid operable valves 454, 456, 458 and 460. The other sides of these windings connect through wires 478, 480, 482 and 484 with, respectively, the fixed switch contacts 486, 488, 490 and 492. The fixed switch contact 494 connects through wire 496 with one side of the electromagnet 402, the other side of the latter connecting through wire 498 with the wire 468 and through wire 500 with the fixed switch contact 502. The fixed switch contact 502 is adapted to be closed by a motor switch control arm 504, the latter connecting through wire 506 with one side of the motor 424. The other side of the motor 424 connects through wire 508 with wire 466.

Figure 5:
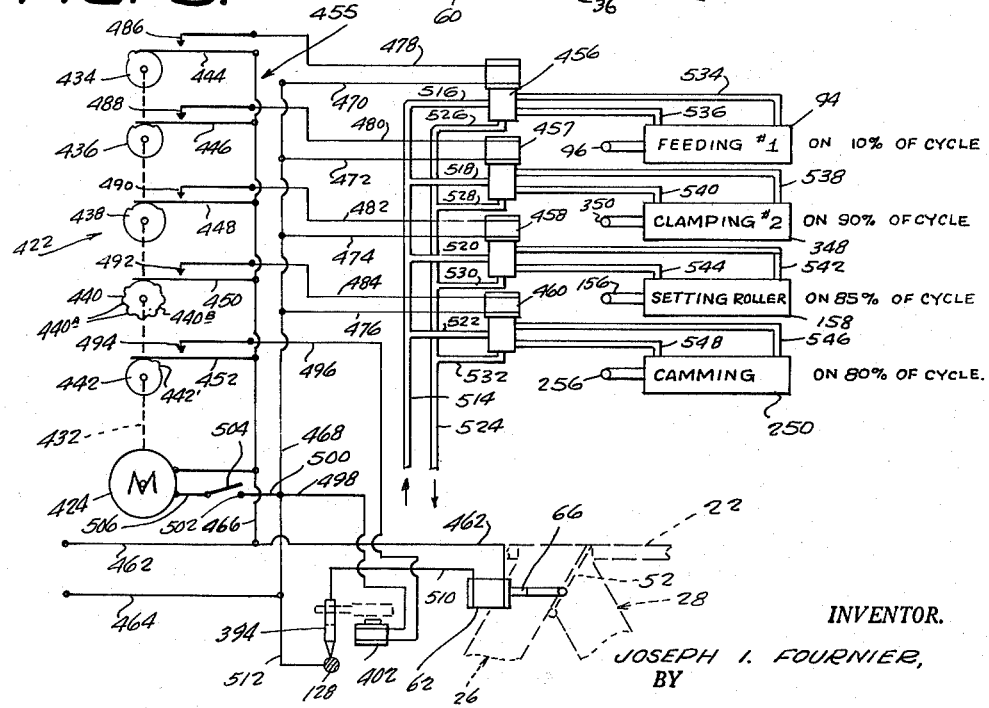
FIGURE 5 is a schematic wiring diagram illustrating the electrical means for controlling the hydraulic cylinders employed in carrying out the cyclic operation of the machine and also illustrating therein the driving means for the pins or chucks, and the control means for selectively separating acceptable or rejected tool steel.

As is seen in FIGURE 5, the wire 462 connects to one side of the solenoid 62, and the other side of the latter connects through wire 510 with the cylindrical element 394. The workpiece 128 is electrically grounded to the machine 20, and a ground connection through wire 512, shown diagrammatically in FIGURE 5, connects the lead 464 therewith.

The hydraulic system for controlling the actuation of the hydraulic cylinders 94, 158, 250 and 348 is schematically shown in FIGURE 5, and the hydraulic system is shown as including a header 514 which has one of its ends connected with the high pressure output side of a hydraulic fluid pump (not shown), the header connecting through feeders 516, 518, 520 and 522 with the inlet sides of the solenoid-actuated valves 454, 456, 458 and 460, respectively. A second header 524 connects with the outlet ports of these valves through branch head conduits 526, 528, 530 and 532.

Conduits 534 and 536 connect with the valves 454 at one of their respective ends, and at their other ends with opposed ends of the hydraulic cylinder 94 on opposite sides of its piston (not shown). These conduits serve, alternately, as fluid-supply and discharge-means in a manner to be described.

Similar conduits 538, 540 connect the opposed ends of the hydraulic cylinder 348 with the valve 456; conduits 542, 544 connect the hydraulic cylinder 348 with the valve 458, and conduits 446, 448 connect the hydraulic cylinder 458 with the valve 460.

The solenoid valves 454, 456, 458 and 460 are of conventional construction and are of the cross-over type, that is, fluid under pressure may be fed through the header 514 and through the valves 454, 456, 458 and 460 and the conduits 534, 538, 542 and 546, while the hydraulic cylinders discharge through conduits 536, 540, 544 and 548 to the header 524 to a fluid reservoir (not shown) in one open position of the aforesaid solenoid valves 456, 457, 458 and 460. On cross-over, and with the solenoid operable valves in their respective open positions, the fluid flow through these conduits connecting the hydraulic cylinders through the valves reverses its direction, but the fluid flow in the headers 514, 524 remains in the same direction.

The operation of the machine or device 20 is as follows:

The bar stock 128 may be heated to its annealing temperature in the hopper 124, and in this heated condition the stock 128 is fed to the chute 126 and comes to rest behind the closure plate 130 while partially resting on the feeder arms 104, 106. While the bar stock 128 may be annealed throughout its length, it is often preferable to anneal the bar stock between the points marked x—x as shown in FIGURE 1.

The motor (not shown) for driving the pulleys 280 and 414 is energized, and the switch arm 504 is closed to energize the motor 424 (see FIGURE 5). The motor 424 now begins to rotate the cams 434, 436, 438, 440 and 442. Assuming that the pairs of pins 120, 122 are in their respective positions shown in FIGURES 1 and 3 with a workpiece 128 disposed between each adjacent pair thereof, as clearly illustrated in FIGURE 3, the cam 434 will now turn to close the switch arm 444 against the fixed switch contact 486. This establishes an electric circuit reading from lead 462, wire 466, switch arm 444, fixed switch contact 486, and wire 478 to one side of the solenoid operated valve 456. The circuit is completed through wires 470 and 468 which are connected with the lead 464. With the energization of the solenoid valve 456, the header 514 is connected directly with the feeding conduit 534 which admits the fluid to one end of the hydraulic cylinder 94 causing its associated piston 96 to extend. This movement of the piston rod 96 forces the block 86 to move in a direction toward the work-holding chucks 288, 326 a distance to position the true axis of the workpiece 128 on the centerline which extends between the work-holding chucks. The vertical distance between the arms 104, 106 and the bed 22 is such that the workpiece 128 is slightly above the bottom of the work chucks 288, 326. When the workpiece 128 has reached this position, as the workpiece 128 is fed toward the work-holding chucks 288, 326, fluid is discharged from the other end of the hydraulic cylinder 94 through the conduit 536 and valve 456 for subsequent delivery to the fluid reservoir through the conduit 526 and header 524. The positive feeding movement referred to supra occurs through 10% of one revolution of the cam 434 or over an arc of 36°.

As the arms 104, 106 approach their final extended position, the cam 436 now actuates the switch arm 446 to close against the fixed switch contact 488. This establishes an electrical circuit through the lead 462, wire 466, switch arm 446, fixed switch contact 488 and wire 480 to one side of the solenoid operated valve 457. The other side of the solenoid operated valve 457 connects through wires 472 and 468 with the lead 464. Establishment of this circuit causes the valve 457 to open to permit fluid under pressure to flow through the branch conduits 518 and 538 to one side of the hydraulic cylinder 348 causing the piston rod 350 thereof to move outwardly therefrom. As the piston rod moves away from the hydraulic cylinder 348, the bearing block 308 together with its work-holding chuck 326 is moved toward the adjacent end of the bar stock 128. This motion is continued until the work-holding chuck 326 receives within its opening 328 the adjacent end of the workpiece 128 and forces the same to move longitudinally, to the left as viewed in FIGURE 1, to effect engagement of the other end of the workpiece 128 within the conical opening 290 of the chuck 288. The length of the stroke of the piston rod 350 is predetermined, of course, depending upon the axial length of the stock 128 upon which work is to be performed. This action positively clamps the workpiece 128 between the work-holding chucks 288, 326, of which, the chuck 288 is driven through the pulley 280 effecting corresponding rotation of the workpiece 128 and the work-holding chuck 326. The hydraulic cylinder 348 maintains its clamped position over 90° of one cycle of rotation of the cam 346, or 324°.

It should be here understood that after the workpiece 128 has been picked up between the work-holding chucks 288, 326, the cam 434 has turned to open the contact between the switch arm 444 and the switch contact 486, whereby the solenoid valve 466 becomes de-energized. This type of valve, as are the others referred to herein, are the conventional spring-loaded type, and upon de-energization of the valve 456, the valve will cross over to connect the conduit 534 with the discharge header 524 while simultaneously connecting the conduit 536 with the feeder 516, and header 514. This, of course, causes the piston rod 96 to retract to position the pins 120, 122 below the lower end of the chute 126 and closure member 130 in order to receive from the chute 126 the next succeeding workpiece 128. As the workpiece 128 is being rotated, the cam 438 closes the switch arm 448 against the fixed switch contact 490, thereby establishing an electrical circuit to the solenoid operated valve 458 through the lead 462, wire 466, switch arm 448, fixed switch contact 450, wire 482 to one side of the solenoid operable valve 458. From the other side of the valve 458 the circuit is traced through wire 474, wire 486 and back to the lead 464. Actuation of this valve causes the piston rod 156 to be extended, fluid under pressure entering the header 514 and passing through the valve 458 and through the conduit 542.

In the position shown in the several figures of the drawings, the roller 244 is illustrated as being substantially at the mid-point between reference letters x—x which constitute the boundaries between which the roller 244 normally will work. In this position the roller 210 is at the mid-point of the cam surface 180, the roller 210 reciprocating between points x'—x', and the piston rod 256 has moved substantially one-half of its throw. Assuming that the roller 244 is moving to the left as viewed in FIGURE 1, the cam 440 has closed the switch arm 450 against the fixed switch contact 492 and has energized the solenoid valve 250 so that fluid under pressure flows from header 514, feeder 520, and conduits 542 to the hydraulic cylinder 158. The circuit may be traced as follows. Current passes through lead 462, wire 466, switch arm 448, fixed switch contact 490, wire 482 to one side of the solenoid valve 458, and from the other side of the solenoid valve 458, wire 474, wire 468 and to lead 464.

It will be understood that throughout this action, the cylinder 158, cam 172, roller 210 and through the roller 244 must force a pre-determined curvature beyond the axis of the workpiece 128 before the roller 244 will cant from the points x—x.

Cam 440 includes a plurality of lobes 44A and depressions 44B which are engaged by the switch arm 450 to ultimately make and break contact with the fixed switch contact 492. Thus, to effect movement of the roller 244 to the left, as viewed in FIGURE 1, one of the lobes 44A must engage the switch arm 450. When the lobe 44A escapes from the switch arm 450, the above-referred to circuit to the solenoid 458 is broken, and the roller 244 begins movement to the right, as viewed in FIGURE 1. This is accomplished, of course, through the cross over or reversal of the solenoid valve 458 so that the conduit 544 now receives therethrough fluid under pressure while the conduit 542 receives discharge fluid from the hydraulic cylinder 158. The number of lobes and depressions therebetween on the cam 440 will determine, of course, the number of times the roller 244 will reciprocate between points x—x. It has been found desirable to effect this reciprocation over 85% of one revolution of the cam 440 or over an expanse of 306°.

It should be here noted that the roller 244 actually works the piece 128 for a time period of 5° less, percentagewise, than the work-holding chucks are effective.

The cam 442 is synchronized with the cam 440 in such a manner that its lobe 442' engages against the switch arm 452 only after the roller 244 has been engaged against the workpiece 128 and reciprocated longitudinally thereof a desired number of times, in the manner referred to above. The synchronization is such that the switch arm 452 closes against the switch contact 494 when the tapered end 398 of the sensing mechanism 356 is substantially at a mid-point, axially, between the points x—x. At this time, and with the closing of the switch arm 452 against the switch contact 494, a circuit is established from lead 462, wire 466, switch arm 452, fixed switch contact 494, and wire 496 to one side of the electromagnet 402. The other side of the electromagnet 402 connects through wire 498 with wire 468 and thence with the other lead 464.

With the electromagnet 402 energized, the carrier block 382 is moved downwardly toward the platform 379. The cylindrical sensing element 394 has been, of course, previously adjusted to clear the bar stock 128 if the same has been trued by the roller 244 within given tolerances. However, if the stock 128, upon rotation thereof, engages the tapered end 398 of the cylindrical element 394, a circuit is established to the solenoid 62 in the following manner, reference being made to the schematic wiring diagram of FIGURE 5. Lead 462 to one side of the solenoid 62, and from the other side of the solenoid through wire 510, the cylindrical sensing element 394, the bar stock 128, and wire 512 back to the other lead 464. If the tapered end 398 makes contact with the stock 128 in the manner suggested above, the armature 66 of the solenoid 62 is withdrawn and moves therewith the separator plate 52 from its full-line position shown in FIGURE 3 to its dotted-line position.

As soon as the cam lobe 442' escapes from the switch arm 452, the circuit to the solenoid 402 is broken and the carrier block 382 moves upwardly under the influence of springs 384. This carries with it the cylindrical sensing element 394 and disengages the tapered end 398 from the bar stock 128. Immediately thereafter the fluid flow through the conduits 538, 540 is reversed, causing the piston rod 350 to move to the right, as viewed in FIGURE 1, thereby disengaging the chuck 326 from the workpiece 128, and at this time, the workpiece 128 will then fall under gravity through the opening 24 and will strike against the plate 52 for entry into the reject chute 28. If, on the other hand, at the time the sensing tapered tip or end 398 of the cylindrical element 394 during the test period does not contact the workpiece 128, the solenoid 62 remains de-energized and the separator plate 52 remains in the full-line position shown in FIGURE 3. Then, upon de-energization of the solenoid 457, the fluid flow through the conduits 538, 540 reverses, as before, but in this instance, the release of the workpiece 128 causes the same to strike against the separator plate 52 for entrance into the chute 32 which accepts only workpieces having the desired tolerances.

The reciprocation of the block 188 occurs during 80% of one revolution of the cam shaft 432 and is not initiated prior to the movement of the roller 244 into engagement with the stock 128.

It is important to note that the axis of the shaft 248 is set at ³⁄₃₂" above the centerline extending between the work-holding chucks 228, 326 whereby, as the roller 244 is moved longitudinally of the workpiece 128, the roller 244 is tilted or canted to one side or the other, this movement being freely obtainable since the roller 244 is carried on the barrel 228 which is rotatable about its longitudinal axis.

One of the more salient features of this invention is found in the setting of the roller 244 so that the axis of the shaft 248 is ³⁄₃₂" above the centerline extending between the work-holding chucks 228, 326. This provides means for changing the angularity of the roller 244 in conformity with the direction of the travel of the carriage 188, otherwise the roller 244 will drag, slip, or take berserk movement during the longitudinal or axial travel thereof relative to the workpiece. The compound thrust occurring from the two indirect centers is relieved from bind by the needle bearings 235 and the thrust bearings 224.

The tapered pins 292, 364 are easily punched out of the work-holding chucks 288, 326 whenever replacement thereof becomes necessary due to excessive wear. The preferred working angle of the conical openings 290, 328 has been found to be 60°, but the machine 20 will operate quite satisfactorily if a range between 45° and 60° is selected.

Having described and illustrated one embodiment of this invention in detail, it will be understood that the same is offered merely by way of example, and that the scope of this invention is to be limited only by the appended claims.

What is claimed is:

1. A method for straightening substantially cylindrical bar stock having a centrally-disposed bowed portion comprising the steps of supporting said stock for rotation about its longitudinal axis, continuously rotating said stock, continuously applying pressure reciprocably longitudinally of said stock along the high side of said bowed portion thereof while said stock is continuously rotating to depress the said high side of said stock so that the generatrix thereof traces a uniform cylindrical plane as the stock is rotated about its longitudinal axis, moving sensing means into proximity with said bar stock adjacent said bowed portion thereof, and the final step of actuating means in response to said sensing means to accept or reject bar stock straightened within given tolerances of a true cylinder.

2. A method for straightening bar tool stock having a substantially cylindrical configuration but out-of-true with respect to the centerline thereof extending between the opposed ends of said bar stock, said method comprising the steps of preheating said bar stock to a temperature permitting deformation thereof under pressure, moving said heated bar stock to and between a pair of rotatable work-holding chucks, moving at least one of said chucks into engagement with one end of said bar stock to force the other end thereof into engagement with the other of said work-holding chucks, rotating said chucks and said bar stock, applying pressure means to said bar stock in a direction perpendicular to its longitudinal axis to effect depression of the high side thereof into a substantially uniform cylindrical configuration throughout the length of said bar stock, reciprocating said pressure-applying means axially of said bar stock while continuously rotating said bar stock, moving sensing means into proximity with that portion of said bar stock upon which said pressure-applying means has been effective, and the further step of actuating means for separating said bar stock to accept said bar stock having a transverse cylindrical configuration within acceptable tolerances or rejecting the same if said bar stock exceeds said tolerances.

3. A machine for straightening axially-elongated substantially cylindrical bar stock having a bowed central portion, said machine comprising a normally horizontal bed, said bed having an opening extending transversely therethrough intermediate its ends, a pair of chutes having a common end surrounding said opening and fixedly secured to said bed, said chutes depending from said bed in diverging directions, a separator plate pivotally supported within said end and movable to close the entry to one or the other of said chutes, a pair of work-holding chucks disposed on opposite sides of said opening and mounted on said bed in spaced confronting relation, means for rotating one of said chucks, said rotatable chuck being fixed on said bed and the other of said chucks being reciprocable toward and away from said fixed rotatable chuck to secure and release said bar stock therebetween, said bar stock falling upon release from said chucks through said opening to strike said separator plate for diversion into one or the other of said chutes, reciprocable means on said bed to feed said bar stock to and between said chucks, said means on said bed effecting reciprocation of said other chuck releasably securing said bar stock between said rotatable and other of said chucks, a roller mounted on said bed, means for effecting reciprocation of said roller in a direction perpendicular to the centerline between said chucks and axially thereof, said roller being movable into and out of engagement with said bar stock positioned between said chucks, said reciprocable means for moving said roller perpendicular to the centerline extending between said chucks including means mounting said roller for alternate pivotal movement about a horizontal axis normally perpendicular to said centerline, and means sensing said bar stock for controlling the position of said separator plate.

4. The machine as defined in claim 3, and timing means mounted on said bed for controlling the actuation of said reciprocable work-holding chucks, said reciprocable stock-feeding means and said reciprocable roller.

5. A machine for straightening bar stock comprising a bed having an opening extending transversely therethrough intermediate the pair of ends thereof, a first bearing block fixedly secured to said bed adjacent said opening, a second bearing block mounted for reciprocation on said bed adjacent said opening, means on said bed for effecting reciprocation of said second bearing block, a bar stock chuck releasably secured in each of said bearing blocks, respectively, each of said chucks having inwardly-extending confronting and axially-aligned conical work-receiving openings formed therein with the centerline thereof extending across said opening formed in said bed, a stock hopper and discharge chute positioned over said bed, stock-feeding means reciprocably mounted on said bed to receive said stock from said chute and move said stock to a position between said chucks, reciprocable means connected to said reciprocable bearing block to move its associated chuck into engagement with the adjacent end of said bar stock and to shift said stock to cause engagement of the other end thereof with said chuck carried on said fixed bearing block, means connected with said chuck carried on said fixed bearing plate to effect continuous rotation of said last-named chuck and consequently rotation of the other of said chucks and said stock, pressure-exerting means mounted on said bed for movement into and out of engagement with said bar stock in a direction perpendicular to the center line extending between said chucks, said pressure-exerting means engaging said bar stock while said bar stock continues to rotate, means co-acting with said pressure-exerting means to effect reciprocation of the latter in a direction parallel to said center line, a pair of chutes surrounding said opening and depending from said bed, a separator plate pivotally mounted on said chutes adjacent the respective upper ends thereof, said separator plate normally closing the upper end of one of said chutes, sensing means for sensing out-of-true bar stock, said sensing means being supported on said bed and adjustable longitudinally of said centerline, means responsive to said sensing means to pivot said separator plate in a direction to close the other of said upper ends of said chutes and simultaneously opening said upper end of said one chute, and means operable to move said reciprocable bearing block and its associated chuck away from its said adjacent end of said bar stock subsequent to the operation of said sensing means to drop said bar stock through said opening whereby said bar stock strikes said plate for deliverance into one or the other of said chutes.

6. A method for straightening substantially cylindrical bar stock having a bowed or deformed central portion out of line with the central axis thereof and being disposed between the opposed ends of said bar stock, said method comprising the steps of supporting said stock for rotation about its longitudinal axis, applying pressure continuously in a reciprocable path to said bowed portion on its high side and axially thereof while said stock is rotating to effect depression of said high side so that the generatrix thereof traces a cylindrical plane as the stock is rotated about its longitudinal axis.

7. A method for straightening substantially cylindrical bar stock having a bowed or deformed central portion out of line with the central longitudinal axis thereof and disposed between its opposed ends, said method comprising the steps of supporting said bar stock for rotation about its central longitudinal axis and applying pressure continuously in a reciprocable path throughout the entire length of said bowed portion, said pressure being exerted on said bowed portion in a linear direction and at an acute angle relative to a horizontal plane passing through the common axis of said bar stock on opposed sides of said bowed portion, said pressure being continuously applied while said bar stock is continuously rotated.

8. A method for straightening substantially cylindrical bar stock having a bowed or deformed central portion out of line with the central longitudinal axis thereof and extending between its opposed ends, said method comprising the steps of supporting said bar stock for rotation about its central longitudinal axis, and applying pressure continuously in a reciprocable path throughout the entire length of said bowed portion while said bar stock is continuously rotated, said pressure being at its maximum at the highest portion of said bowed portion and automatically and continuously diminishing as said pressure reciprocates over portions of said bowed portion on opposite sides of said high portion of said bowed portion of said bar stock.

9. A machine for straightening axially-elongated substantially cylindrical bar stock having a bowed central portion intermediate its opposed ends and comprising means for supporting the opposed ends of said stock therebetween, means for effecting rotation of said supporting means and consequently of said bar stock about the longitudinal axis of the latter, pressure means constantly applied to said bar stock during the continuous rotation thereof, said pressure means being supported for movement axially of said bar stock to apply pressure constantly to only the outwardly-bowed portion of said stock to depress the same in order that the generatrix of said bar stock is substantially uniform about the longitudinal axis thereof giving rise to a substantially cylindrical plane extending from end-to-end thereof, and means to effect cyclic reciprocation of said pressure means relative to bar stock.

10. A machine for straightening axially-deformed elongated substantially cylindrical bar stock having a centrally-located bowed portion intermediate its opposed ends, said means comprising a bed, means fixedly secured to said bed to support the opposed ends of said stock therebetween, means to effect rotation of said support means and consequently of said bar stock about its longitudinal axis, automatically-operable variable pressure-applying means mounted on said bed for engagement with the outer bowed portion of said bar stock as said bar stock continues to rotate, said pressure-applying means exerting its maximum pressure at the highest portion of said bowed portion and in constantly diminishing pressure on opposite sides of said highest portion of said bowed portion, and means on said bed for reciprocating said last-named means transversely and longitudinally of the longitudinal axis of said bar stock while said bar stock is rotated whereby the bowed portion of said bar stock is straightened and the generatrix of said bar stock traces a substantially true cylinder about the longitudinal axis of said bar stock.

11. A machine for straightening axially-elongated substantially cylindrical bar stock having a bowed portion intermediate its ends and comprising a normally horizontal bed, a pair of rotatable work-holding chucks to engage the opposed ends of said bar stock, said chucks being mounted on said bed in spaced confronting and substantially parallel relation, means rotatably driving one of said chucks and consequently rotating said stock therebetween, means to effect rotation of said support held between said chucks and the other of said chucks, means on said bed to move the other of said chucks toward and away from said one chuck to alternately secure and release said bar stock from therebetween, automatically-actuated pressure-exerting means mounted on said bed for movement into and out of engagement with said bowed portion of said bar stock in a direction perpendicular to the center line extending between said chucks, said pressure-exerting means engaging said bowed portion of said bar stock only and exerting a maximum pressure on the highest portion thereof and a constantly diminishing pressure on each side thereof in a direction toward the opposed ends, respectively, of said bar stock as said bar stock continues to rotate, and means coacting with said pressure-exerting means to effect reciprocation of the latter in a direction parallel to said center line as said bar stock continues to rotate.

12. A machine for straightening axially-elongated substantially cylindrical bar stock having a bowed central portion, said machine comprising a normally horizontal bed, a pair of work-holding chucks mounted on said bed in spaced confronting relation, means on said bed for rotating one of said chucks, the other of said chucks being reciprocable toward and away from said one chuck to secure and release said bar stock therebetween, reciprocable means on said bed to feed said bar stock to and between said chucks, a roller mounted on said bed, means for effecting reciprocation of said roller in a direction perpendicular to the center line extending between said chucks and axially thereof, said reciprocation of said roller causing the same to move into and out of engagement with said bar stock positioned between said chucks, said reciprocable means including means mounting said roller for alternate pivotal movement about a normally horizontal axis extending perpendicular to said center line, and reciprocable means mounted on said bed to effect reciprocation of said roller in a direction parallel to the longitudinal axis of said bar stock.

References Cited by the Examiner
UNITED STATES PATENTS

| | | | |
|---|---|---|---|
| 533,714 | 2/95 | Leighton | 153—50 |
| 1,382,309 | 6/21 | Moltrup | 153—48 |
| 1,551,715 | 9/25 | Urschel | 153—52 |
| 2,144,955 | 1/39 | Antonelli | 82—25 |
| 2,433,322 | 12/47 | Peterson | 153—48 |
| 2,647,552 | 8/53 | Magnuson et al. | 153—48 |
| 3,040,887 | 6/62 | Cornelison | 209—82 |
| 3,051,216 | 8/62 | Tomka et al. | 153—48 |

FOREIGN PATENTS 922,797    2/47    France.

OTHER REFERENCES

American Machinist: Dial Feeds Synchronized by Air; pp. 101–103; Nov. 6, 1947.

CHARLES W. LANHAM, *Primary Examiner.*

WILLIAM J. STEPHENSON, *Examiner.*